(12) United States Patent
Wang et al.

(10) Patent No.: US 10,551,948 B2
(45) Date of Patent: Feb. 4, 2020

(54) TOUCH SUBSTRATE AND MANUFACTURING METHOD THEREOF, TOUCH SCREEN

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jing Wang, Beijing (CN); Xiaodong Xie, Beijing (CN); Min He, Beijing (CN); Guiyu Zhang, Beijing (CN); Zouming Xu, Beijing (CN); Qitao Zheng, Beijing (CN); Xinbin Tian, Beijing (CN); Dong Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 59 days.

(21) Appl. No.: 15/836,278

(22) Filed: Dec. 8, 2017

(65) Prior Publication Data
US 2018/0188839 A1 Jul. 5, 2018

(30) Foreign Application Priority Data
Jan. 4, 2017 (CN) .......................... 2017 1 0003968

(51) Int. Cl.
*G06F 3/041* (2006.01)

(52) U.S. Cl.
CPC .... *G06F 3/041* (2013.01); *G06F 2203/04103* (2013.01)

(58) Field of Classification Search
CPC combination set(s) only.
See application file for complete search history.

(56) References Cited

U.S. PATENT DOCUMENTS

| | | | |
|---|---|---|---|
| 2013/0050123 A1* | 2/2013 | Lien | G06F 3/041 345/173 |
| 2014/0132569 A1* | 5/2014 | Lien | G06F 3/041 345/175 |

* cited by examiner

*Primary Examiner* — Robin J Mishler
(74) *Attorney, Agent, or Firm* — Nath, Goldberg & Meyer; Joshua B. Goldberg; Daniel Bissing

(57) ABSTRACT

The present application discloses a touch substrate and a manufacturing method thereof, and a touch screen. The touch substrate has a touch area and a function-hole area and includes a base substrate and a light shielding pattern which defines the touch area and the function-hole area. The touch substrate further includes a touch unit and a first blanking pattern arranged in the touch area and a first insulating layer, a second blanking pattern and a transmission enhancement pattern arranged in the function-hole area. The first blanking pattern and the second blanking pattern are arranged in a same layer, and the transmission enhancement pattern is configured to increase a light transmittance of an area corresponding to the second blanking pattern.

20 Claims, 7 Drawing Sheets

TOUCH SUBSTRATE AND MANUFACTURING METHOD THEREOF, TOUCH SCREEN

CROSS-REFERENCE TO RELATED APPLICATION

This application claims priority to Chinese Patent Application No. 201710003968.3, filed on Jan. 4, 2017, the contents of which are incorporated by reference in the entirety.

FIELD

The present disclosure relates to the field of display technologies, and particularly, to a touch substrate and a manufacturing method thereof, and a touch screen.

BACKGROUND

Currently, touch control products may have various function-hole (for example, camera hole) designs. The addition of function hole may increase product added value and optimize user experience.

There is a known structure of a function-hole area of a touch substrate, which is formed by sequentially stacking a base substrate, a first insulating layer, a blanking layer and a second insulating layer.

It has also proposed a structure of a function-hole area of a touch substrate, in which the blanking layer and the second insulating layer are etched off, while the base substrate and the first insulating layer remain.

SUMMARY

Embodiments of the present disclosure provide a touch substrate having a touch area and a function-hole area, and the touch substrate includes a base substrate and a light shielding pattern arranged on the base substrate, the light shielding pattern defining the touch area and the function-hole area; wherein the touch substrate further includes: a touch unit and a first blanking pattern arranged in the touch area, the touch unit being arranged on the base substrate, and the first blanking patterning being arranged on a side of the touch unit distal to the base substrate; and a first insulating layer, a second blanking pattern and a transmission enhancement pattern arranged in the function-hole area, the first insulating layer being arranged on the base substrate, the second blanking pattern being arranged on a side of the first insulating layer distal to the base substrate and partially covering the function-hole area, and the transmission enhancement pattern being arranged on a side of the second blanking pattern distal to the base substrate or a side of the second blanking pattern proximal to the base substrate and being arranged in correspondence to the second blanking pattern; and the first blanking pattern and the second blanking pattern are arranged in a same layer, and the transmission enhancement pattern is configured to increase a light transmittance of an area corresponding to the second blanking pattern.

Optionally, the touch unit includes a touch electrode arranged on the base substrate; and the transmission enhancement pattern is arranged on the side of the second blanking pattern proximal to the base substrate and in a same layer as the touch electrode.

Optionally, the touch electrode and the transmission enhancement pattern are made of a same material.

Optionally, the material includes indium tin oxide.

Optionally, the touch unit further includes a signal line, which is electrically connected to the touch electrode through a through hole.

Optionally, the touch substrate further includes a second insulating layer pattern arranged on a side of the first blanking pattern distal to the base substrate; and the transmission enhancement pattern is arranged on the side of the second blanking pattern distal to the base substrate and in a same layer as the second insulating layer pattern.

Optionally, the second insulating layer pattern and the transmission enhancement pattern are made of a same material.

Optionally, the second blanking pattern includes a plurality of second blanking sub-patterns separated from each other; and the plurality of second blanking sub-patterns are uniformly distributed in the function-hole area.

Optionally, a ratio between an area of the second blanking pattern and an area of the function-hole area is in a range from about 80% to about 90%.

Embodiments of the present disclosure further provide a touch screen including any one of the above touch substrates.

Embodiments of the present disclosure further provide a manufacturing method of a touch substrate having a touch area and a function-hole area, and the method includes:

forming a light shielding pattern on a base substrate, the light shielding pattern defining the touch area and the function-hole area;

forming a touch unit on the base substrate and in an area corresponding to the touch area, and forming a first insulating layer on the base substrate;

forming a first blanking pattern and a second blanking pattern on a side of the first insulating layer distal to the base substrate, the first blanking pattern and the second blanking pattern being in a same layer, the first blanking pattern covering an area corresponding to the touch unit, and the second blanking pattern partially covering the function-hole area; and forming a transmission enhancement pattern, the transmission enhancement pattern being on a side of the second blanking pattern distal to the base substrate or a side of the second blanking pattern proximal to the base substrate and being arranged in correspondence to the second blanking pattern, and the transmission enhancement pattern being configured to increase a light transmittance of an area corresponding to the second blanking pattern.

Optionally, the touch unit includes a touch electrode; the step of forming the transmission enhancement pattern and the step of forming the touch unit are performed simultaneously, and the step of forming the transmission enhancement pattern and the touch unit includes:

forming a transparent conductive material layer on the base substrate; and performing one patterning process on the transparent conductive material layer to form the touch electrode and the transmission enhancement pattern, the touch electrode being in the touch area, and the transmission enhancement pattern being in the function-hole area and being arranged in correspondence to the second blanking pattern to be subsequently formed.

Optionally, the touch electrode further includes a signal line; and the step of forming the transmission enhancement pattern and the touch unit further includes:

forming the first insulating layer on a side of the touch electrode and the transmission enhancement pattern distal to the base substrate, a through hole being formed in the first insulating layer at a position corresponding to the touch electrode; and forming the signal line on the side of the first insulating layer distal to the base substrate, the signal line and the touch electrode being electrically connected through the through hole.

Optionally, the transparent conductive material layer is made of indium tin oxide.

Optionally, the step of forming the first blanking pattern and the second blanking pattern on the side of the first insulating layer distal to the base substrate includes:

forming a blanking material layer on a side of the first insulating layer distal to the base substrate;

forming a second insulating material layer on a side of the blanking material layer distal to the first insulating layer;

performing one patterning process on the second insulating material layer to form a second insulating layer pattern, the second insulating layer pattern covering the touch area; and performing a screen printing and etching process on the blanking material layer to form the first blanking pattern and the second blanking pattern, the first blanking pattern covering the area corresponding to the touch unit, and the second blanking pattern partially covering the function-hole area.

Optionally, the step of forming the transmission enhancement pattern is performed prior to the step of forming the first blanking pattern and the second blanking pattern, and the step of forming the transmission enhancement pattern, the first blanking pattern and the second blanking pattern includes:

forming a blanking material layer on the side of the first insulating layer distal to the base substrate;

forming a second insulating layer on a side of the blanking material layer distal to the first insulating layer;

performing one patterning process on the second insulating material layer to form a second insulating layer pattern and the transmission enhancement pattern, the second insulating layer pattern covering the touch area, and the transmission enhancement pattern being arranged in correspondence to the second blanking pattern to be subsequently formed; and performing a screen printing and etching process on the blanking material layer to form the first blanking pattern and the second blanking pattern, the first blanking pattern covering an area corresponding to the touch unit, and the second blanking pattern partially covering the function-hole area.

Optionally, the second blanking pattern includes a plurality of second blanking sub-patterns separated from each other; and the plurality of second blanking sub-patterns are uniformly distributed in the function-hole area.

Optionally, a ratio between an area of the second blanking pattern and an area of the function-hole area is in a range from about 80% to about 90%.

Optionally, a projection of the second blanking pattern on the base substrate substantially completely overlaps with a projection of the transmission enhancement pattern on the base substrate.

BRIEF DESCRIPTION OF THE FIGURES

The following drawings are merely examples for illustrative purposes according to various disclosed embodiments and are not intended to limit the scope of the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
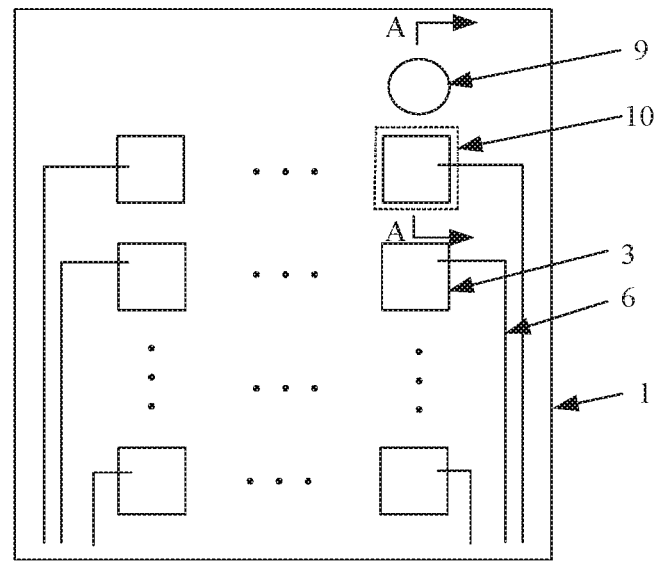
FIG. 1 is a top view of a touch substrate in the prior art.
Figure 2:
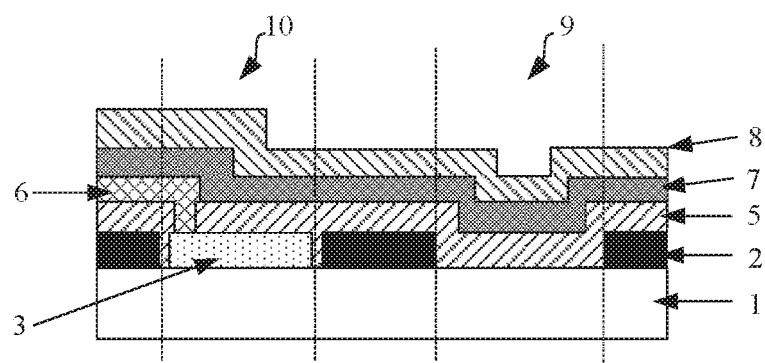
FIG. 2 is a sectional view taken along line A-A of FIG. 1.

FIG. 1 is a top view of a touch substrate in the prior art, and FIG. 2 is a sectional view taken along line A-A of FIG. 1. As shown in FIGS. 1 and 2, in order to realize a touch function, a light shielding pattern 2, a touch electrode 3, a first insulating layer 5 and a signal line 6 has to be sequentially formed on a base substrate 1. The signal line 6 and the touch electrode 3 are electrically connected through a through hole provided in the first insulating layer 5. Generally, after the formation of the touch electrode 3, the first insulating layer 5 and the signal line 6, a blanking layer 7 is formed on a side of the first insulating layer 5 distal to the base substrate 1 and a second insulating layer 8 for protecting the blanking layer 7 is formed on a side of the blanking layer 7 distal to the first insulating layer 5 to ensure the appearance requirement on the product and the blanking effect on the touch substrate (i.e., shadow elimination effect on the touch substrate), wherein the blanking layer 7 is generally made of silicon oxynitride ($SiN_xO_y$). With the above processes, the structure of a function-hole area 9 of the existing touch substrate includes the base substrate 1, the first insulating layer 5, the blanking layer 7 and the second insulating layer 8, as shown in FIG. 2.

In the prior art, as other functions e.g., camera shooting, photograph) need to be implemented at the function-hole area 9, requirements on the overall light transmittance and chromaticity of the function-hole area 9 is strict, that is, high light transmittance and low chromaticity are required. The overall light transmittance (typically, 89% to 92%) of the structure formed by sequentially stacking the base substrate 1, the first insulating layer 5, the blanking layer 7 and the second insulating layer 8 is relatively high, so the requirement (typically, larger than 90%) on the overall light transmittance of the function-hole area 9 is relatively easily met;

however, the entire function-hole area 9 is yellowish because the blanking layer 7 is yellowish, and thus it cannot conform to the requirement on the overall chromaticity of the function hole-area 9.

Figure 3:
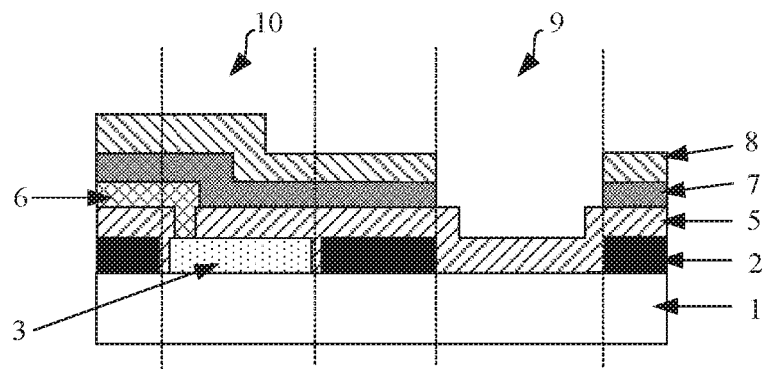
FIG. 3 is a structural schematic diagram illustrating a touch substrate in the prior art, after removing a blanking layer in a function-hole area.

FIG. 3 is a sectional diagram illustrating a touch substrate in the prior art, after removing a blanking layer in a function-hole area. Compared to the touch substrate shown in FIG. 2, the blanking layer 7 and the second insulating layer 8 in the function-hole area 9 of the touch substrate shown in FIG. 3 are etched off. In this case, the structure of the function-hole area 9 includes a structure formed by stacking the base substrate 1 and the first insulating layer 5. While the overall chromaticity of the function-hole area 9 may meet the requirement by etching off the blanking layer 7 in the function-hole area 9, it is found in production that residual blanking material always remains in the function-hole area 9 due to process limitations when the blanking layer 7 in the function-hole area 9 is etched and removed. The overall light transmittance of the function-hole area 9 is lowered due to the influence of the residual blanking material. In this case, the overall light transmittance of the function-hole area 9 is from 87% to 90%, which is hardly to meet the requirement on the overall light transmittance of the function-hole area.

Accordingly, the present disclosure provides, inter alia, a touch substrate and a manufacturing method thereof, and a touch screen that substantially obviate one or more of the problems due to limitations and disadvantages of the related art.

Figure 4:
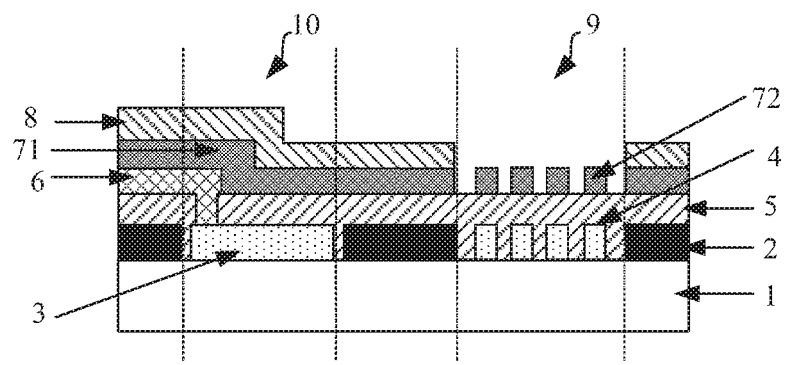
FIG. 4 is a structural schematic diagram of a touch substrate according to embodiments of the present disclosure.
Figure 5:
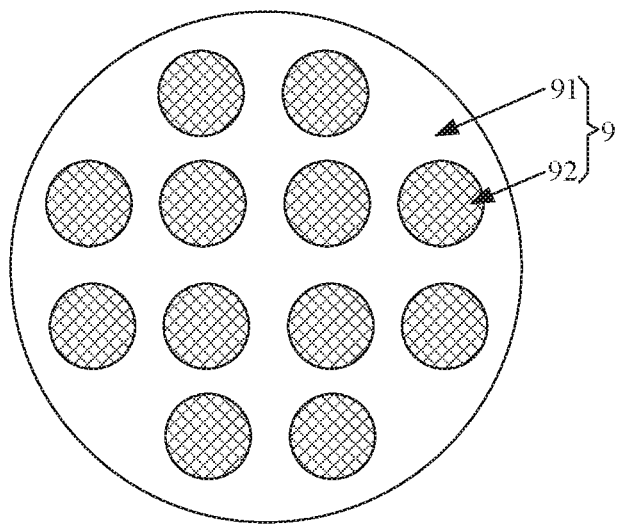
FIG. 5 is a top view of a function-hole area of a touch substrate according to embodiments of the present disclosure.

FIG. 4 is a structural schematic diagram of a touch substrate according to embodiments of the present disclosure; and FIG. 5 is a top view of a function-hole area of a touch substrate according to embodiments of the present disclosure. As shown in FIGS. 4 and 5, the touch substrate in some embodiments includes a base substrate 1 and a light shielding pattern 2 arranged on the base substrate 1, and the light shielding pattern 2 defines a touch area 10 and a function-hole area 9. It should be noted that one touch area 10 and one function-hole area 9 being illustrated in figures are merely for illustrative purpose, and the technical solutions of the present disclosure are not limited thereto. Those skilled in the art should be understood that the shape, quantity, size and location of each of the touch area 10 and the function-hole area 9 can be adjusted according to actual needs, which will not be explained herein by listing specific cases.

The touch substrate in sonic embodiments further includes a touch unit and a first blanking pattern 71 arranged in the touch area 10. The touch unit is arranged on the base substrate 1. The first blanking pattern 71 is arranged at a side of the touch unit distal to the base substrate 1. The touch unit generally includes a touch electrode 3 and a signal line 6, which are electrically connected through a through hole. It should be noted that the term "touch electrode" in the present disclosure refers to an electrode for implementing touch function, such as a self-capacitance touch electrode, a mutual-capacitance touch electrode. The principle of implementing the touch function by using these types of electrodes will not be described herein in detail.

The touch substrate in some embodiments further includes a first insulating layer 5, a second blanking pattern 72 and a transmission enhancement pattern 4, which are arranged in the function-hole area 9. The first insulating layer 5 is arranged on the base substrate 1. The second blanking pattern 72 is arranged on a side of the first insulating layer 5 distal to the base substrate 1 and partially covers the function-hole area 9. The transmission enhancement pattern 4 is arranged on a side of the second blanking pattern 72 distal to the base substrate 1 (which will be described later) or a side of the second blanking pattern 72 proximal to the base substrate 1 (as shown in FIG. 4), and the transmission enhancement pattern 4 is arranged in correspondence to the second blanking pattern 72. For example, a projection of the second blanking pattern 72 on the base substrate 1 substantially completely overlaps with a projection of the transmission enhancement pattern 4 on the base substrate 1. In some embodiments, the first blanking pattern 71 and the second blanking pattern 72 are arranged in a same layer, and the transmission enhancement pattern 4 is configured to increase a light transmittance of an area corresponding to the second blanking pattern 72.

In some embodiments, the blanking pattern is made of at least one of silicon oxide and silicon oxynitride.

In the function-hole area 9 of the touch substrate provided by the present disclosure, the function-hole area 9 is divided into a first transmittance area 91 and second transmittance areas 92 depending on a location of the transmission enhancement pattern 4 (or the second blanking pattern 72), as shown in FIG. 5. In some embodiments, an area where the transmission enhancement pattern 4 and the second blanking pattern 72 are not provided is the first transmittance area 91, and areas where the transmission enhancement pattern 4 and the second blanking pattern 72 are provided are the second transmittance areas 92. Thus, the first transmittance area 91 merely includes two layer structures of the base substrate 1 and the first insulating layer 5, and the second transmittance areas 92 include four layer structures of the base substrate 1, the first insulating layer 5, the second blanking pattern 72 and the transmission enhancement pattern 4.

Because the first transmittance area 91 merely includes the two layer structures of the base substrate 1 and the first insulating layer 5, the chromaticity of the first transmittance area 91 is relatively low. However, when the first blanking pattern 71 and the second blanking pattern 72 are practically prepared, a blanking material layer as a whole layer needs to be deposited first, and then the blanking material in the first transmittance area 91 is etched off by a patterning process. Due to the limitations on the process, residual blanking material always remains in the first transmittance area 91, and the residual blanking material remained in the first transmittance area 91 may affect an overall light transmittance of the first transmittance area 91. As such, the overall light transmittance of the first transmittance area 91 is relatively low, typically about 87% to about 90%. Thus, the overall chromaticity of the first transmittance area 91 is relatively low and the overall light transmittance of the first transmittance area 91 is relatively low.

Compared to the first transmittance area 91, the second transmittance areas 92 include the second blanking pattern 72 and the transmission enhancement pattern 4 in addition to the base substrate 1 and the first insulating layer 5. The provision of the second blanking pattern 72 and the transmission enhancement pattern 4 may cause an overall light transmittance of the second transmittance areas 92 to be relatively higher, typically about 89% to about 92%. However, an overall chromaticity of the second transmittance areas 92 may be higher because both of the second blanking pattern 72 and the transmission enhancement pattern 4 have a certain colour. Thus, the overall chromaticity of the second transmittance areas 92 is relatively high and the overall light transmittance of the second transmittance areas 92 is relatively high.

It has been found in actual measurements that the function-hole area 9 consisting of the first transmittance area 91 and the second transmittance areas 92 can present a low overall chromaticity and a high overall light transmittance.

In some embodiments, optionally, a ratio between an area of the second blanking pattern 72 and an area of the function-hole area 9 is from about 80% to about 90%. In the present disclosure, the area of the second blanking pattern 72 refers to an area of an orthographic projection of the second blanking pattern 72 on the base substrate 1, and the area of the function-hole area 9 refers to an area of an orthographic projection of the function-hole area 9 on the base substrate 1. This rule also applies to other elements. Referring to FIG. 5, for example, an area of the large circle may correspond to the area of the function-hole area 9, and a sum of areas of individual small circles may correspond to the area of the second blanking pattern 72. In some embodiments, in a case where the area of the function-hole area 9 is fixed, the areas of the first and second transmittance areas 91 and 92 may be adjusted according to actual needs. For example, in a case where the requirement on the overall chromaticity of the function-hole area 9 is relatively high, i.e., a low chromaticity is required, the area of the first transmittance area 91 may be increased (e.g., an area of a projection of the first transmittance area 91 on the base substrate 1 may be increased), and the area of the second transmittance areas 92 may be decreased accordingly (e.g., an area of a projection of the second transmittance areas 92 on the base substrate 1 may be decreased accordingly); and in a case where the requirement on the overall light transmittance of the function-hole area 9 is relatively high, i.e., a high light transmittance is required, the area of the second transmittance areas 92 may be increased (e.g., the area of the projection of the second transmittance areas 92 on the base substrate 1 may be increased), and the area of the first transmittance area 91 may be decreased accordingly (e.g., the projection of the first transmittance area 91 on the base substrate 1 may be decreased accordingly).

In some embodiments, optionally, the second blanking pattern 72 includes a plurality of second blanking sub-patterns separated from each other; and the plurality of second blanking sub-patterns are uniformly distributed in the function-hole area 9. In other words, the second transmittance areas 92 are uniformly distributed in the function-hole area 9, e.g., as shown in FIG. 5. In the technical solution of the present disclosure, by uniformly distributing the second transmittance areas 92 in the function-hole area 9, the uniformities of the chromaticity and light transmittance at various positions of the function-hole area 9 can be effectively ensured.

As a specific implementation shown in FIG. 4, the transmission enhancement pattern 4 is arranged at a side of the blanking pattern 72 proximal to the base substrate 1 and in a same layer as the touch electrode 3. It should be noted that "A and B are arranged in a same layer" in the present disclosure means that A and B are formed from one material layer through a single patterning process. In the present disclosure, "patterning process" refers to a process including photoresist coating, exposure, development, etching, photoresist removal, etc. As the transmission enhancement pattern 4 and the touch electrode 3 can be formed through a single patterning process, the transmission enhancement pattern 4 can be formed through an existing procedure of manufacturing a touch substrate without introducing any additional processing step. Moreover, a thickness of a material layer from which the touch electrode 3 and the transmission enhancement pattern 4 are formed may be set in advance by experiments, e.g., the thickness may be set to be odd times of ¼ light wavelength, such that the transmission enhancement pattern 4 obtained by a patterning process has a transmission enhancement function while its chromaticity is not excessively high.

Further, the touch electrode 3 and the transmission enhancement pattern 4 may be made of indium tin oxide (ITO). The indium tin oxide has characteristics of superior conductivity, high light transmittance and low chromaticity, such that the second transmittance areas 92 are ensured to have a high light transmittance and a low chromaticity.

Embodiments of the present disclosure provide a touch substrate having a touch area and a function-hole area, and the touch substrate includes a base substrate and a light shielding pattern arranged on the base substrate, the light shielding pattern defining the touch area and the function-hole area. The touch substrate further includes: a touch unit and a first blanking pattern arranged in the touch area, the touch unit being arranged on the base substrate, and the first blanking pattern being arranged on a side of the touch unit distal to the base substrate; and a first insulating layer, a second blanking pattern and a transmission enhancement pattern arranged in the function-hole area, the first insulating layer being arranged on the base substrate, the second blanking pattern being arranged on a side of the first insulating layer distal to the base substrate and partially covering the function-hole area, and the transmission enhancement pattern being arranged on a side of the second blanking pattern proximal to the base substrate and being arranged in correspondence to the second blanking pattern. In the technical solution of the present disclosure, by arranging the blanking pattern and the transmission enhancement pattern in part of the function-hole area, an area of the function-hole area with the blanking pattern and the transmission enhancement pattern has a relatively high light transmittance and chromaticity, while an area of the function-hole area without the blanking pattern and the transmission enhancement pattern has a relatively low light transmittance and chromaticity. In this case, the overall light transmittance of the function-hole area is relatively high, and the overall chromaticity thereof is relatively low.

Figure 6:
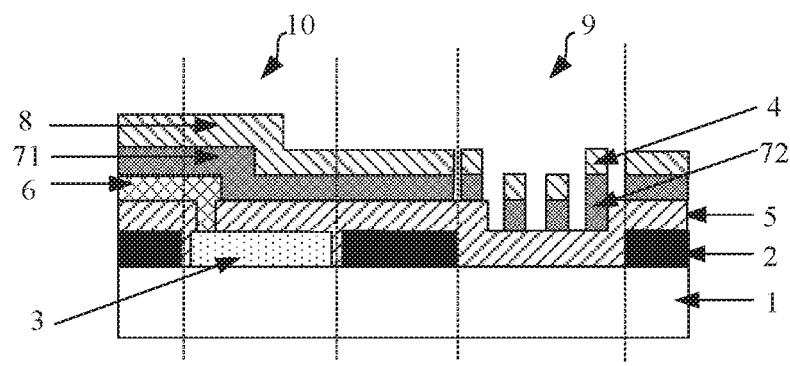
FIG. 6 is a structural schematic diagram of a touch substrate according to embodiments of the present disclosure.

FIG. 6 is a structural schematic diagram of a touch substrate according to embodiments of the present disclosure. The touch substrate shown in FIG. 6 is different from that in FIG. 4 in that a second insulating layer pattern 8 is arranged on the first blanking pattern 71, and the transmission enhancement pattern 4 is arranged on a side of the second blanking pattern 72 distal to the base substrate 1 and in a same layer as the second insulating layer pattern 8.

It should be noted that the second insulating layer pattern 8 is generally made of an organic material, so a patterning process can be completed by merely using a mask to expose and develop the organic material during the formation of the second insulating layer pattern 8 and the transmission enhancement pattern 4. Moreover, a thickness of a material layer from which the second insulating layer pattern 8 and the transmission enhancement pattern 4 are formed may be set in advance by experiments, e.g., the thickness may be set to be odd times of ¼ light wavelength, such that the transmission enhancement pattern 4 obtained by the patterning process has a transmission enhancement function while its chromaticity is not excessively high.

The touch substrate shown in FIG. 6 has a similar effect as that in FIG. 4.

Figure 7:
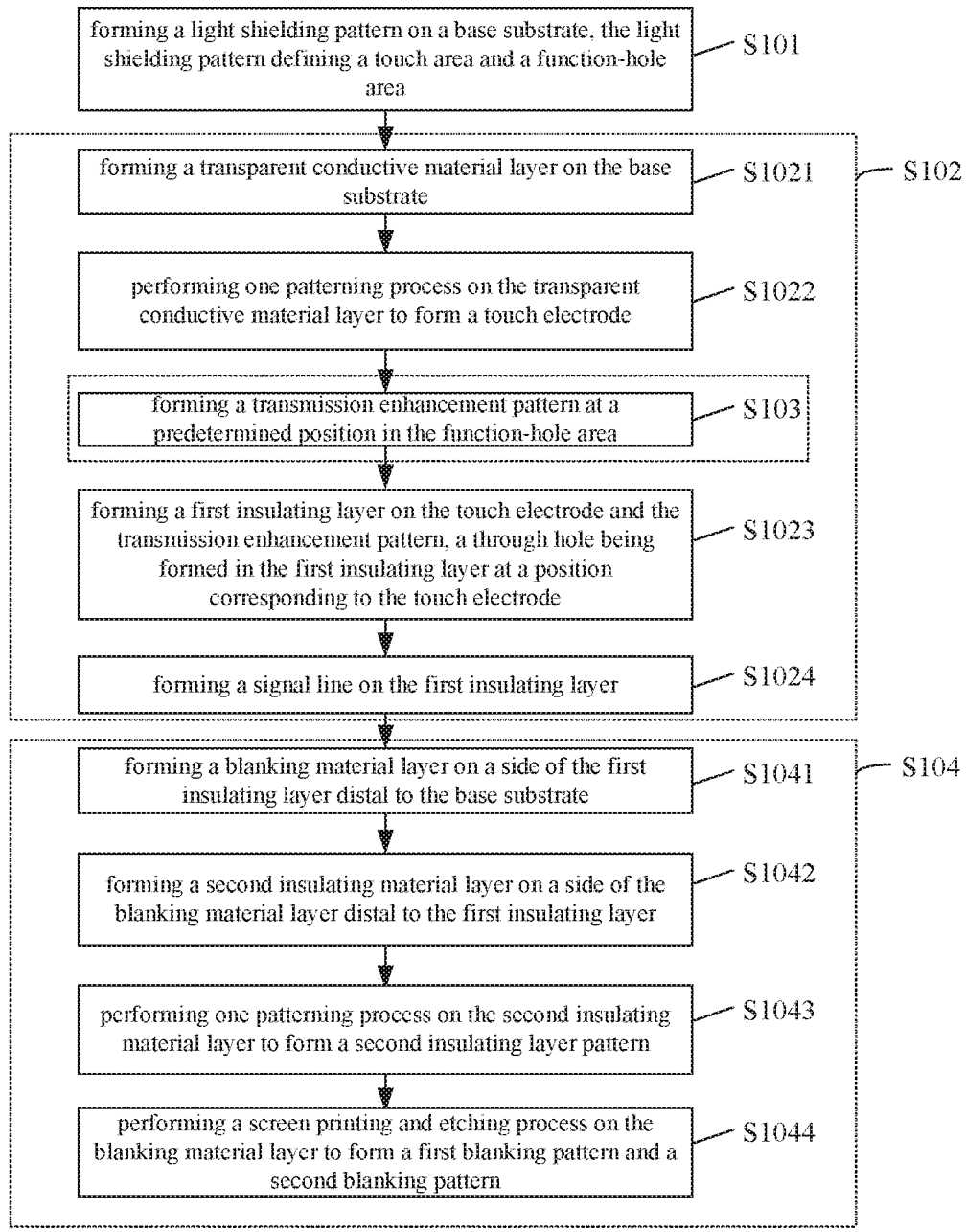
FIG. 7 is a flow chart illustrating a manufacturing method of a touch substrate according to embodiments of the present disclosure.
Figure 8:
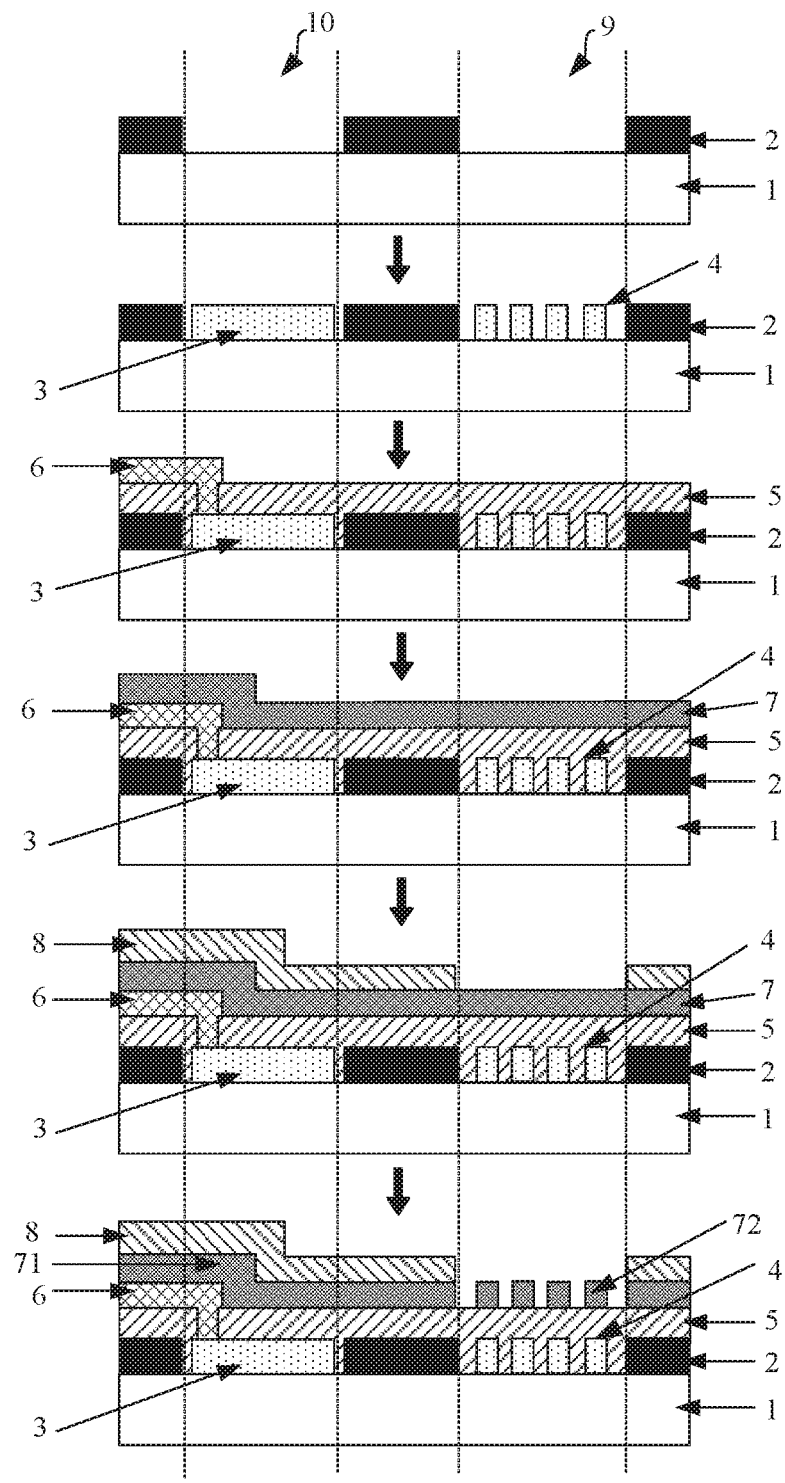
FIG. 8 is a schematic diagram illustrating intermediate structures of a touch substrate manufactured by using the manufacturing method of FIG. 7.

FIG. 7 is a flow chart illustrating a manufacturing method of a touch substrate according to embodiments of the present disclosure; and FIG. 8 is a schematic diagram illustrating intermediate structures of a touch substrate manufactured by using the manufacturing method of FIG. 7. The method is adopted for manufacturing the above-described touch substrate. As shown in FIGS. 7 and 8, the method includes the following steps S101 to S104.

Step S101, forming a light shielding pattern on a base substrate, the light shielding pattern defining a touch area and a function-hole area.

At step S101, a layer of light shielding material layer is deposited on the base substrate 1, and then a patterning process is performed on the light shielding material layer to obtain the light shielding pattern 2, which defines the touch area 10 and the function-hole area 9. In the figure, one touch area 10 and one function-hole area 9 are illustrated by way of example.

Step S102, forming a touch unit on the base substrate and in an area corresponding to the touch area, and forming a first insulating layer on the base substrate.

The touch unit includes a touch electrode 3 and a signal line 6. Step 102 specifically includes the following steps S1021 to S1024.

Step S1021, forming a transparent conductive material layer on the base substrate, the transparent conductive material optionally including indium tin oxide.

Step S1022, performing one patterning process on the transparent conductive material layer to form the touch electrode.

The touch electrode 3 is in the touch area 10.

Step S1023, forming the first insulating layer on the touch electrode and a transmission enhancement pattern, a through hole being formed in the first insulating layer at a position corresponding to the touch electrode.

At step S1023, a layer of first insulating material layer may be deposited, and then a patterning process is performed on the first insulating material layer to form the through hole, the remaining first insulating material serves as the first insulating layer.

Step S1024, forming the signal line on the first insulating layer.

At step S1024, a layer of conductive material layer (e.g., a metal material layer) is deposited on a side of the first insulating layer 5 distal to the base substrate 1, and then a patterning process is performed on the conductive material layer to form the signal line 6, which is electrically connected to the touch electrode 3 through the through hole.

Step S103, forming the transmission enhancement pattern at a predetermined position in the function-hole area.

It should be noted that the step S103 and the step S1022 can be performed simultaneously. That is, a single patterning process is performed on the transparent conductive material layer to form the touch electrode 3 and the transmission enhancement pattern 4 simultaneously, the touch electrode 3 is in the touch area 10, and the transmission enhancement pattern 4 is at the predetermined position in the function-hole area 9 to partially cover the function-hole area 9. The transmission enhancement pattern 4 is used for improving the light transmittance at the predetermined position.

As the manufacturing process of the transmission enhancement pattern 4 can be incorporated into the manufacturing process of the existing touch substrate, the manufacturing process of the existing substrate is not required to be changed.

Step S104, forming a first blanking pattern and a second blanking pattern on a side of the first insulating layer distal to the base substrate.

Optionally, the step S104 includes the following steps S1041 to S1044.

Step S1041, forming a blanking material layer on a side of the first insulating layer distal to the base substrate.

Optionally, the blanking material is at least one of silicon oxide and silicon oxynitride.

Step S1042, forming a second insulating material layer on a side of the blanking material layer distal to the first insulating layer.

Step S1043, performing one patterning process on the second insulating material layer to form a second insulating layer pattern, which covers the touch area.

With the step S1043, the second insulating material is completed removed from the function-hole area 9, and the remaining second insulating material forms the second insulating layer pattern 8. At this time, the blanking material layer 7 in the function-hole area 9 is exposed.

It should be noted that, the above steps S101 to S103 and steps S1041 to S1043 are each performed on a mother substrate. After the step S1043 is finished, the mother substrate as a whole is subjected to a cutting and singulation process (not shown in figures) to form a plurality of small-sized substrates, and the following step S1044 is performed on each of the small-sized substrates.

Step S1044, performing a screen printing and etching process on the blanking material layer to form the first blanking pattern and the second blanking pattern, the first blanking pattern covering the area corresponding to the touch unit, and the second blanking pattern partially covering the function-hole area.

At step S1044, the screen printing and etching process, which is suitable for a small-sized substrate, is adopted for patterning the blanking material on the small-sized substrates, so as to obtain the first blanking pattern 71 and the second blanking pattern 72 simultaneously. The first blanking pattern 71 covers the area corresponding to the touch unit, and the second blanking pattern 72 is arranged in correspondence to the transmission enhancement pattern 4 to partially cover the function-hole area 9.

It should be noted that, when the screen printing and etching process is performed on the blanking material layer 7 in part of the function-hole area 9, the etched area will always have residual blanking material due to limitations of the processes.

Moreover, the above-described order of patterning the second insulating material layer, singulation of the mother substrate, and performing the screen printing and etching process on the blanking material layer 7 of the small-sized substrate serves as an optional solution of the present embodiment, which will not limit the technical solution of the present disclosure. Considering that the technical solution of the present disclosure requires a high accuracy in position of the second blanking pattern 72 (i.e., the second blanking pattern 72 is required to be aligned accurately with the transmission enhancement pattern 4) and the screen printing and etching process has a higher accuracy than the exposing and etching process, the screen printing and etching process is selected and used in the present disclosure to pattern the blanking material layer 7 to ensure the accurate alignment of the second blanking pattern 72 and the transmission enhancement pattern 4.

Needless to say, it is also possible in the present embodiment to start with performing an exposing and etching process on the mother substrate to pattern the blanking material 7, thereby forming the first blanking pattern 71 and the second blanking pattern 72, followed by steps of forming a layer of second insulating material layer on the first blanking pattern 71 and the second blanking pattern 72, removing the second insulating material in the function-hole area 9, and performing the cutting and singulation process. This case is not illustrated in figures.

Optionally, the second blanking pattern 72 includes a plurality of second blanking sub-patterns separated from each other; and the plurality of second blanking sub-patterns are uniformly distributed in the function-hole area 9, thus the uniformities of the chromaticity and light transmittance at various positions of the function-hole area 9 can be ensured.

Optionally, a ratio between an area of the second blanking pattern 72 and an area of the function-hole area 9 is from about 80% to about 90%.

In the technical solution of the present disclosure, by arranging the blanking pattern and the transmission enhancement pattern in part of the function-hole area, an area of the function-hole area with the blanking pattern and the transmission enhancement pattern has a relatively high light transmittance and chromaticity, while an area of the function-hole area without the blanking pattern and the transmission enhancement pattern has a relatively low light transmittance and chromaticity. In this case, the overall light transmittance of the function-hole area is relatively high, and the overall chromaticity thereof is relatively low.

Figure 9:
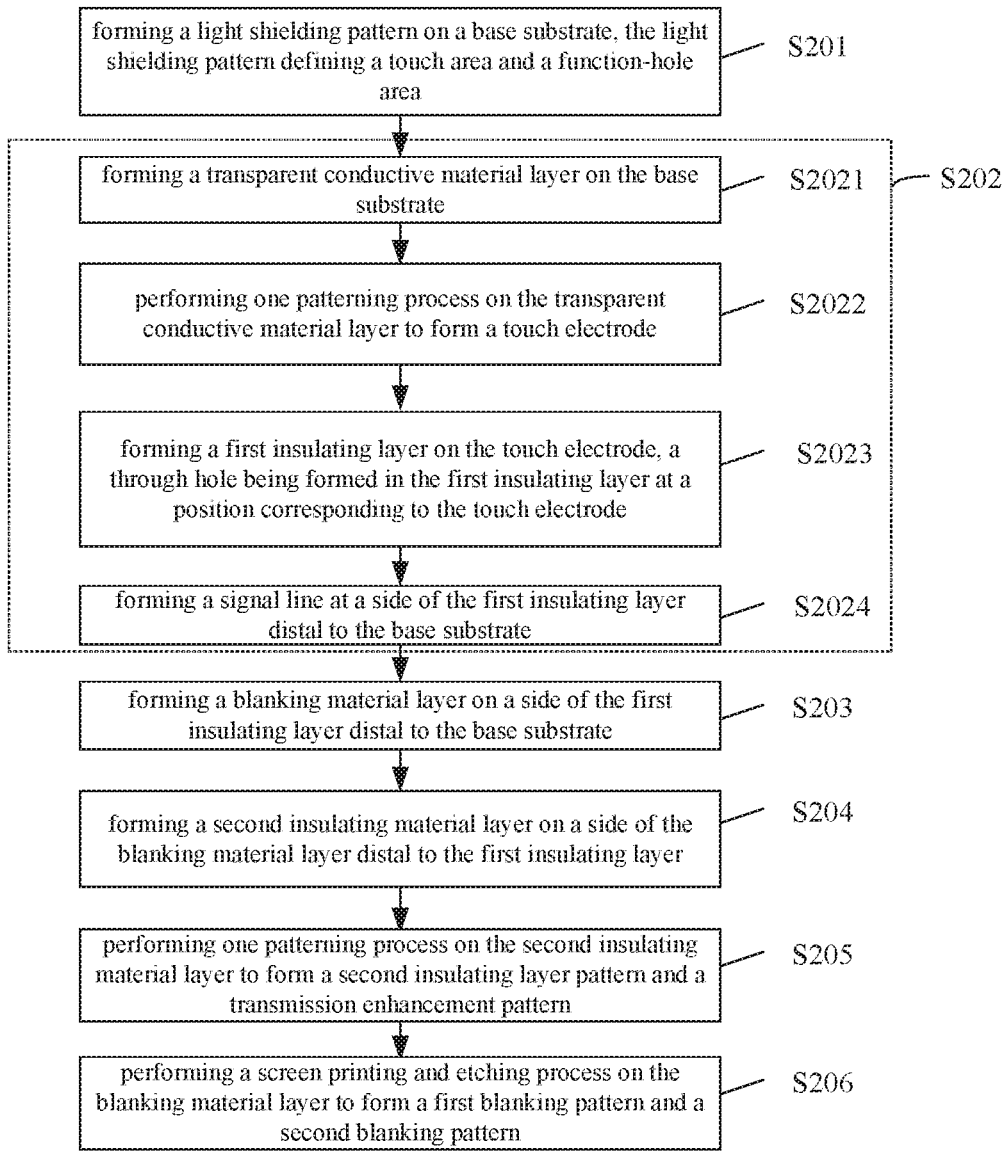
FIG. 9 is a flow chart illustrating a manufacturing method of a touch substrate according to embodiments of the present disclosure.
Figure 10:
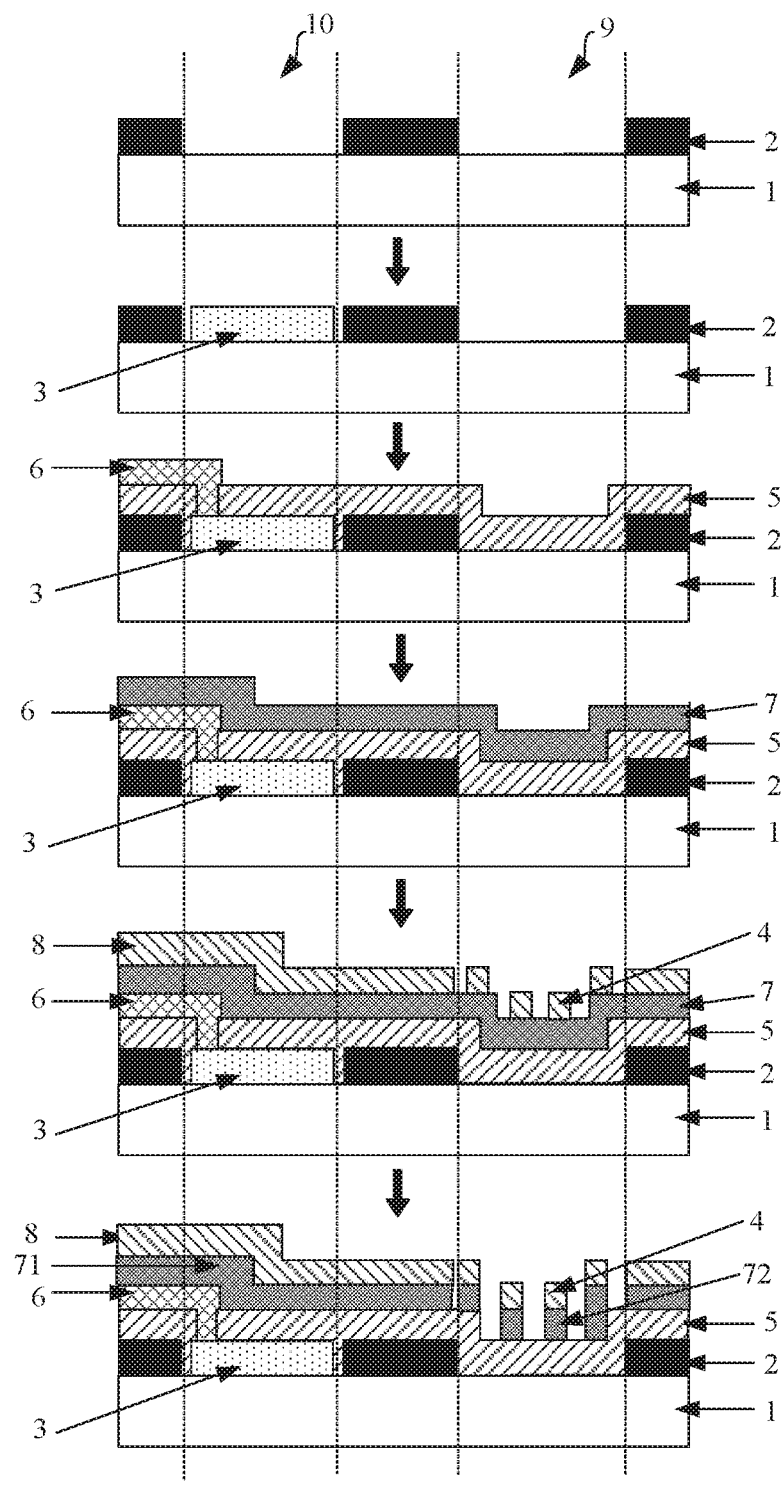
FIG. 10 is a schematic diagram illustrating intermediate structures of a touch substrate manufactured by using the manufacturing method of FIG. 9.

FIG. 9 is a flow chart illustrating a manufacturing method of a touch substrate according to embodiments of the present disclosure; and FIG. 10 is a schematic diagram illustrating intermediate structures of a touch substrate manufactured by using the manufacturing method of FIG. 9. The method is adopted for manufacturing the above-described touch substrate. As shown in FIGS. 9 and 10, the method includes the following steps S201 to S206.

Step S201, forming a light shielding pattern on a base substrate, the light shielding pattern defining a touch area and a function-hole area.

Step S202, forming a touch unit on the base substrate and in an area corresponding to the touch area, and forming a first insulating layer on the base substrate.

The step S202 includes the following steps S2021 to S2024.

Step S2021, forming a transparent conductive material layer on the base substrate.

Step S2022, performing one patterning process on the transparent conductive material layer to form the touch electrode.

At step S2022, the transparent conductive material in the function-hole area is completed etched off.

Step S2023, forming a first insulating layer on the touch electrode, a through hole being formed in the first insulating layer at a position corresponding to the touch electrode.

Step S2024, forming a signal line at a side of the first insulating layer distal to the base substrate.

After the above steps S201 and S2021 to S2024, the light shielding pattern 2, the touch electrode 3, the first insulating layer 5 and the signal line 6 can be formed on the base substrate 1. The detailed descriptions of these steps may refer to corresponding contents with reference to FIGS. 4 and 5, and will not be repeated herein.

Step S203, forming a blanking material layer on a side of the first insulating layer distal to the base substrate.

Step S204, forming a second insulating material layer on a side of the blanking material layer distal to the first insulating layer.

Step 205, performing one patterning process on the second insulating material layer form a second insulating layer pattern and a transmission enhancement pattern.

The second insulating layer pattern 8 covers the touch area 10, and the transmission enhancement pattern 4 is arranged at a predetermined position in the function-hole area 9 to partially cover the function hole area 9.

It should be noted that, the above steps S201 to S205 are each performed on mother substrate. After the step S205 is finished, the mother substrate is subjected to a cutting and singulation process (not shown in figures) to form a plurality of small-sized substrates, and the following step S206 is performed on each of the small-sized substrates.

Step S206, performing a screen printing and etching process on the blanking material layer to form a first blanking pattern and a second blanking pattern.

The first blanking pattern 71 covers the area corresponding to the touch unit, and the second blanking pattern 72 are arranged in correspondence to the transmission enhancement pattern 4 and partially covers the function-hole area 9. For example, a projection of the second blanking pattern 72 on the base substrate 1 substantially completely overlaps with a projection of the transmission enhancement pattern 4 on the base substrate 1.

In the present embodiment, by employing the screen printing and etching process to form the second blanking pattern 72, an accurate alignment of the second blanking pattern 72 and the transmission enhancement pattern 4 can be effectively ensured.

Needless to say, it is also possible in the present embodiment to start with performing an exposing and etching process on the mother substrate to pattern the blanking material 7, thereby forming the first blanking pattern 71 and the second blanking pattern 72, followed by steps of depositing a layer of second insulating material layer, removing the second insulating material in an area of the function-hole area 9 without the second blanking pattern 72 while remaining the second insulating material right above the second blanking pattern 72, and performing the cutting and singulation process. This case is not illustrated in figures.

Optionally, the second blanking pattern 72 includes a plurality of second blanking sub-patterns separated from each other; and the plurality of second blanking sub-patterns are uniformly distributed in the function-hole area 9, thus the uniformities of the chromaticity and light transmittance at various positions of the function-hole area 9 can be ensured.

Optionally, a ratio between an area of the second blanking pattern 72 and an area of the function-hole area 9 is from about 80% to about 90%.

In the technical solution of the present disclosure, by arranging the blanking pattern and the transmission enhancement pattern in part of the function-hole area, an area of the function-hole area with the blanking pattern and the transmission enhancement pattern has a relatively high light transmittance and chromaticity, while an area of the function-hole area without the blanking pattern and the transmission enhancement pattern has a relatively low light transmittance and chromaticity. In this case, the overall light transmittance of the function-hole area is relatively high, and the overall chromaticity thereof is relatively low.

Embodiments of the present disclosure further provide a touch screen including any of the above-described touch substrates, the details of which may refer to the description with reference to FIGS. 4-6 and will not be repeated herein.

It should be understood that the above implementations are merely exemplary implementations adopted for explaining the principle of the present disclosure, but the present disclosure is not limited thereto. For those skilled in the art, various modifications and improvements may be made without departing from the spirit and essence of the present disclosure, and these modifications and improvements are also considered to be within the protection scope of the present disclosure.

What is claimed is:

1. A touch substrate having a touch area and a function-hole area, the touch substrate comprising a base substrate and a light shielding pattern arranged on the base substrate, the light shielding pattern defining the touch area and the function-hole area; wherein the touch substrate further comprises:
    a touch unit and a first blanking pattern arranged in the touch area, the touch unit being arranged on the base substrate, and the first blanking patterning being arranged on a side of the touch unit distal to the base substrate; and
    a first insulating layer, a second blanking pattern and a transmission enhancement pattern, which are arranged in the function-hole area, the first insulating layer being arranged on the base substrate, the second blanking pattern being arranged on a side of the first insulating layer distal to the base substrate and partially covering the function-hole area, and the transmission enhancement pattern being arranged on a side of the second blanking pattern distal to the base substrate or a side of the second blanking pattern proximal to the base substrate and being arranged in correspondence to the second blanking pattern;
    the first blanking pattern and the second blanking pattern are arranged in a same layer, and the transmission enhancement pattern is configured to increase a light transmittance of an area corresponding to the second blanking pattern,
    wherein in a plan view of the function-hole area, the function-hole area comprises a first area having the second blanking pattern and the transmission enhancement pattern and a second area without the second blanking pattern and the transmission enhancement pattern, and
    wherein the first area has a light transmittance higher than a light transmittance of the second area.

2. The touch substrate according to claim 1, wherein the touch unit comprises a touch electrode arranged on the base substrate; and
    the transmission enhancement pattern is arranged on the side of the second blanking pattern proximal to the base substrate and in a same layer as the touch electrode.

3. The touch substrate according to claim 2, wherein the touch electrode and the transmission enhancement pattern are made of a same material.

4. The touch substrate according to claim 3, wherein the material comprises indium tin oxide.

5. The touch substrate according to claim 2, wherein the touch unit further comprises a signal line which is electrically connected to the touch electrode through a through hole.

6. The touch substrate according to claim 1, further comprising a second insulating layer pattern arranged on a side of the first blanking pattern distal to the base substrate, wherein the transmission enhancement pattern is arranged on the side of the second blanking pattern distal to the base substrate and in a same layer as the second insulating layer pattern.

7. The touch substrate according to claim 6, wherein the second insulating layer pattern and the transmission enhancement pattern are made of a same material.

8. The touch substrate according to claim 1, wherein the second blanking pattern comprises a plurality of second blanking sub-patterns separated from each other; and the plurality of second blanking sub-patterns are uniformly distributed in the function-hole area.

9. The touch substrate according to claim 1, wherein a ratio between an area of the second blanking pattern and an area of the function-hole area is in a range from about 80% to about 90%.

10. The touch substrate according to claim 1, wherein a projection of the second blanking pattern on the base substrate substantially completely overlaps with a projection of the transmission enhancement pattern on the base substrate.

11. A touch screen, wherein the touch screen comprises the touch substrate of claim 1.

12. A manufacturing method of a touch substrate having a touch area and a function-hole area, comprising:
    forming a light shielding pattern on a base substrate, the light shielding pattern defining the touch area and the function-hole area;
    forming a touch unit on the base substrate and in an area corresponding to the touch area, and forming a first insulating layer on the base substrate;
    forming a first blanking pattern and a second blanking pattern on a side of the first insulating layer distal to the base substrate, the first blanking pattern and the second blanking pattern being in a same layer, the first blanking pattern covering an area corresponding to the touch unit, and the second blanking pattern partially covering the function-hole area; and
    forming a transmission enhancement pattern, the transmission enhancement pattern being on a side of the second blanking pattern distal to the base substrate or a side of the second blanking pattern proximal to the base substrate and being arranged in correspondence to the second blanking pattern, and the transmission enhancement pattern being configured to increase a light transmittance of an area corresponding to the second blanking pattern,
    wherein in a plan view of the function-hole area, the function-hole area comprises a first area in which the second blanking pattern and the transmission enhancement pattern are formed and a second area in which the second blanking pattern and the transmission enhancement pattern are not formed, and
    wherein the first area has a light transmittance higher than a light transmittance of the second area.

13. The method according to claim 12, wherein the touch unit comprises a touch electrode; and
    the step of forming the transmission enhancement pattern and the step of forming the touch unit are performed simultaneously, and the step of forming the transmission enhancement pattern and the touch unit comprises:
    forming a transparent conductive material layer on the base substrate; and
    performing one patterning process on the transparent conductive material layer to form the touch electrode and the transmission enhancement pattern, the touch electrode being in the touch area, and the transmission enhancement pattern being in the function-hole area and being arranged in correspondence to the second blanking pattern to be subsequently formed.

14. The method according to claim 13, wherein the touch electrode further comprises a signal line; and the step of forming the transmission enhancement pattern and the touch unit further comprises:
    forming the first insulating layer on a side of the touch electrode and the transmission enhancement pattern distal to the base substrate, a through hole being formed in the first insulating layer at a position corresponding to the touch electrode; and forming the signal line on the side of the first insulating layer distal to the base substrate, the first signal line and the touch electrode being electrically connected through the through hole.

15. The method according to claim 13, wherein the transparent conductive material layer includes indium tin oxide.

16. The method according to claim 13, wherein the step of forming the first blanking pattern and the second blanking pattern on the side of the first insulating layer distal to the base substrate comprises:
- forming a blanking material layer on the side of the first insulating layer distal to the base substrate;
- forming a second insulating material layer on a side of the blanking material layer distal to the first insulating layer;
- performing one patterning process on the second insulating material layer to form a second insulating layer pattern, the second insulating layer pattern covering the touch area; and
- performing a screen printing and etching process on the blanking material layer to form the first blanking pattern and the second blanking pattern, the first blanking pattern covering the area corresponding to the touch unit, and the second blanking pattern partially covering the function-hole area.

17. The method according to claim 12, wherein the step of forming the transmission enhancement pattern is performed prior to the step of forming the first blanking pattern and the second blanking pattern, and the step of forming the transmission enhancement pattern, the first blanking pattern and the second blanking pattern comprises:
- forming a blanking material layer on the side of the first insulating layer distal to the base substrate;
- forming a second insulating material layer on a side of the blanking material layer distal to the first insulating layer;
- performing one patterning process on the second insulating material layer to form a second insulating layer pattern and the transmission enhancement pattern, the second insulating layer pattern covering the touch area, and the transmission enhancement pattern being arranged in correspondence to the second blanking pattern to be subsequently formed; and
- performing a screen printing and etching process on the blanking material layer to form the first blanking pattern and the second blanking pattern, the first blanking pattern covering an area corresponding to the touch unit, and the second blanking pattern partially covering the function-hole area.

18. The method according to claim 12, wherein the second blanking pattern comprises a plurality of second blanking sub-patterns separated from each other; and the plurality of second blanking sub-patterns are uniformly distributed in the function-hole area.

19. The method according to claim 12, wherein a ratio between an area of the second blanking pattern and an area of the function-hole area is in a range from about 80% to about 90%.

20. The method according to claim 12, wherein a projection of the second blanking pattern on the base substrate substantially completely overlaps with a projection of the transmission enhancement pattern on the base substrate.

* * * * *